June 6, 1950 P. B. SAGAR 2,510,481
SPACE HEATING CONTROL SYSTEM
Filed July 16, 1945
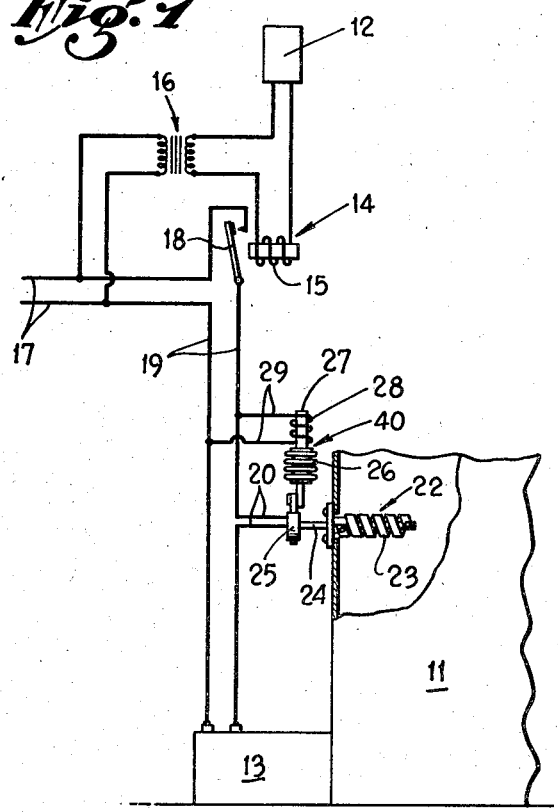
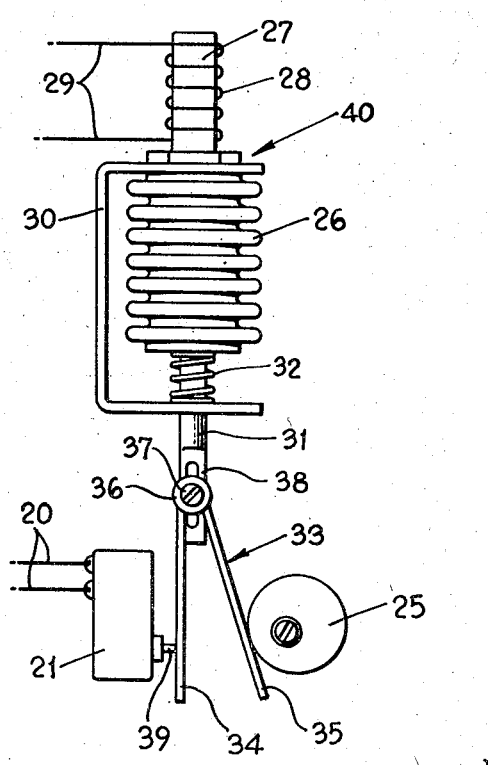
Inventor:
PAUL B. SAGAR,
By John H. Rouse,
Attorney.

Patented June 6, 1950

2,510,481

UNITED STATES PATENT OFFICE 2,510,481

SPACE-HEATING CONTROL SYSTEM

Paul B. Sagar, Cleveland, Ohio, assignor to General Controls Co., Glendale, Calif., a corporation of California Application July 16, 1945, Serial No. 605,393

1 Claim. (Cl. 236—9)

My present invention relates to a temperature control system for an enclosed space or room the temperature of which is changed by the circulation of a medium such as air, water or steam; a general object of the invention being to provide in such a system novel means for compensating for the effect of variation of outdoor temperature.

The desirability of varying, in accordance with variation of outdoor temperature, the temperature of the medium supplied to the space is well recognized since closer control of the space temperature is then achieved. To this end, it is the custom of many users of heating apparatus of the hot-air type to change, periodically or seasonally, the setting of the high-limit or bonnet thermostat; however, fully satisfactory results usually cannot be achieved by such procedure. Apparatus for automatically adjusting the bonnet-thermostat setting in accordance with outdoor temperature is available, and in a common form includes a thermal bulb located outside the building and connected by a capillary tube to the heating apparatus. The cost of such apparatus and of its installation however prohibits its general use. It is therefore a more particular object of this invention to provide means, which do not substantially increase the cost of the heating-control equipment or its installation, whereby, effectively, the setting of the bonnet thermostat is compensatingly adjusted in accordance with variation of outdoor temperature. Having discovered that the average proportion of time that the room thermostat is in demanding condition affords a reliable measure of the outdoor temperature, I accomplish the aforesaid object by the provision of means whereby energy is generated and stored in response to the heat-demand of the room thermostat and is applied to the controlling means of the bonnet thermostat to effect the desired compensation.

More particularly, it is an object of the invention to provide a heat-motor energized under the control of the room thermostat, and means operated by the motor for varying the effective setting of the bonnet thermostat in accordance with the amount of heat stored in the motor.

For full understanding of the invention, and further appreciation of its objects and advantages, reference is to be had to the following detailed description and accompanying drawing, and to the appended claim.

In the drawing:

Figure 1 is a diagrammatic view of a temperature control system embodying the invention; and Figure 2 is an enlarged end-elevation of the means, shown in Fig. 1, for adjusting the effective setting of the high-limit thermostat.

Referring more particularly to the drawing, the numeral 11 indicates a furnace which is adapted to supply, by forced circulation or gravity, hot air to an enclosed space or room wherein a room-thermostat 12 is located. The furnace may be of any conventional type employing gas, oil or coal for fuel; electrical apparatus for controlling the supply of such fuel being indicated at 13. Energization of this apparatus is controlled by the room-thermostat 12 through an electrical relay 14, the coil 15 of which is in series with the contacts of the thermostat and the secondary of a step-down transformer 16 connected across alternating-current supply lines 17. When the relay-armature 18 is attracted due to the closing of the room-thermostat contacts in response to demand for heat in the room, the fuel-supplying apparatus 13 is connected by wires 19 to the electric-supply lines in series with (through branch wires 20) normally-closed switching mechanism 21 (see Fig. 2) operated by a high-limit thermostat 22 mounted on the bonnet portion of the furnace and comprising a helical bi-metallic element 23 subjected to the hot air in the bonnet and so connected to a shaft 24 that the same is rotated in accordance with variations of bonnet temperature; a cam 25, secured to shaft 24, serving to actuate the switching mechanism 21 in a manner hereinafter to be described. The system so far described is conventional and operates to supply hot air to the room in accordance with the demand of the room thermostat; the high-limit thermostat 22 functioning to interrupt heating, regardless of the demand of the room thermostat, upon predetermined rise of bonnet temperature.

The room thermostat 12 also controls the energization of a heat-motor generally indicated at 40 and comprising an expansible-contractible metallic bellows 26 which is sealed and contains a thermally-expansible fluid. Secured to the top end-wall of the bellows, and preferably extending part-way within the bellows, is a rod 27 of good heat-conducting metal around which, but electrically insulated therefrom, is a heating winding 28 which is connected by leads 29 to the wires 19. As is seen in Fig. 2, the bellows is mounted at its top on one end-arm of a U-shaped bracket 30 and has, secured to its bottom end-wall, a stem 31 which extends through an opening in the other end-arm of the bracket; a spring 32 encircling the portion of the stem between the bellows and the bracket and serving to apply a compressive force to the bellows. Carried by the lower portion of stem 31 is a member 33 formed by a strip of stiff metal which is bent to provide a pair of angularly-spaced arms 34 and 35; the member being pivotally connected at the junction of its arms, by a fitting 36 and screw 37, to a flattened portion 38 of the stem which is slotted so that the member can be adjustably positioned with respect thereto.

The heat-motor 40 and switching mechanism 21 are so mounted (by means not shown) with respect to the cam 25 of the high-limit thermostat 22 that the member 33 depends between the cam and the switching mechanism, as is seen in Fig. 2, so that in the rotation of the cam in response to rise of bonnet temperature it engages arm 35 of member 33 and thereby rocks the same about its pivot to effect, through arm 34, depression of the actuating button 39 of the switching mechanism (which is of a conventional normally-closed snap-action type) whereby the electric circuit of the fuel-supplying apparatus 13 is interrupted. The member 33 is sufficiently stiff that it does not yield appreciably in normal operation but can serve as a strain-release if the force applied to it should become abnormal.

While the room thermostat 12 is in closed condition, and relay 14 correspondingly closed, current flows through the winding 28 and thereby effects heating of the bellows 26 and the fluid contained therein so that, by the resultant expansion of the bellows against the force of bias spring 32, the member 33 is lowered. Due to the angular shape of member 33 when this member is in its lowered position the cam 25 must rotate through a greater arc in order to effect actuation of the switching mechanism so that the effective temperature-setting of the bonnet thermostat 22 is raised. Conversely, when the bellows is allowed to cool the effective setting of the bonnet thermostat is lowered due to the resultant raising of member 33.

The heat-motor 40 is designed to have relatively high thermal capacity, and suitable thermal insulation (not shown) is provided, so that the movement of the bellows in response to heating or subsequent cooling is quite slow. The heat delivered to the motor establishes therein a temperature which corresponds to the average proportion of time that the room thermostat is in closed or demanding condition, so that the storage of thermal energy in the motor, and hence the effective setting of the bonnet thermostat, is proportional to the heat-loss from the space or building. Inasmuch as the heat-loss corresponds generally to the temperature existing outdoors, it is seen that by the system of the present invention the bonnet temperature is so compensatingly adjusted that the air delivered to the space is warmer in cool weather than it is in warm and hence its temperature-changing property is more effective in the maintenance of close control of the room temperature.

While the invention has been described in connection with the control of a hot-air furnace, it obviously also may be applied to systems wherein the temperature-changing medium is in the form of hot water, steam, cold air, or refrigerant. Further, the embodiment herein shown and described is susceptible of modification without departing from the spirit of the invention, and I intend therefore to be limited only by the scope of the appended claim.

I claim as my invention:

In a heating control system for a space or room: electrically-controlled apparatus for heating a fluent medium and supplying it to said space; a first thermostat comprising a cam rotatable in response to variation of the temperature of said medium in said apparatus, and a switch for interrupting the operation of the apparatus and actuated by rotation of said cam in response to rise of temperature of the medium; a second thermostat, in said space, normally controlling the operation of said apparatus in accordance with the demand for heat in the space; a heat-motor; electrical means controlled by said second thermostat for energizing said heat-motor while the second thermostat is in demanding condition; said heat-motor being adapted to store thermal energy produced therein during successive periods of energization so that its movement is slow; and means actuated by said heat-motor and comprising a member interposed between said cam and said switch and movable by the cam to actuate the switch, the thickness of the interposed portion of said member so varying along its path of actuation by the heat-motor that the effective temperature-setting of the first thermostat is proportional to the amount of thermal energy stored in the heat-motor.

PAUL B. SAGAR.

REFERENCES CITED

The following references are of record in the file of this patent:

UNITED STATES PATENTS

| Number | Name | Date |
| --- | --- | --- |
| 1,978,709 | Hill | Oct. 30, 1934 |
| 2,006,658 | Smulski | July 2, 1935 |
| 2,189,381 | McGrath | Feb. 6, 1940 |
| 2,254,960 | Harris | Sept. 2, 1941 |
| 2,256,840 | Haines | Sept. 23, 1941 |

FOREIGN PATENTS

| Number | Country | Date |
| --- | --- | --- |
| 553,336 | Great Britain | May 18, 1943 |